United States Patent
Vignoli et al.

(10) Patent No.: US 8,166,044 B2
(45) Date of Patent: Apr. 24, 2012

(54) METHOD AND APPARATUS FOR SELECTING ITEMS FROM A NUMBER OF ITEMS

(75) Inventors: Fabio Vignoli, Veldhoven (NL); Steffen Clarence Pauws, Eindhoven (NL); Yasmina Priniastuti Haryono, Eindhoven (NL); Vicentius Paulus Buil, Eindhoven (NL)

(73) Assignee: Koninklijke Philips Electronics N.V., Eindoven (NL)

( * ) Notice: Subject to any disclaimer, the term of this patent is extended or adjusted under 35 U.S.C. 154(b) by 542 days.

(21) Appl. No.: 11/568,639

(22) PCT Filed: May 3, 2005

(86) PCT No.: PCT/IB2005/051448
§ 371 (c)(1),
(2), (4) Date: Sep. 11, 2008

(87) PCT Pub. No.: WO2007/106877
PCT Pub. Date: Nov. 10, 2007

(65) Prior Publication Data
US 2009/0006353 A1 Jan. 1, 2009

Related U.S. Application Data

(60) Provisional application No. 60/568,136, filed on May 5, 2004, provisional application No. 60/673,332, filed on Apr. 20, 2005.

(51) Int. Cl.
G06F 17/30 (2006.01)

(52) U.S. Cl. ........................................ 707/748

(58) Field of Classification Search .................. 707/748, 707/749, 758
See application file for complete search history.

(56) References Cited

U.S. PATENT DOCUMENTS

| 5,616,876 | A  | * | 4/1997  | Cluts .......................... 84/609 |
| 6,201,176 | B1 | * | 3/2001  | Yourlo ......................... 84/609 |
| 6,633,845 | B1 | * | 10/2003 | Logan et al. ................ 704/255 |
| 2002/0083055 | A1 | * | 6/2002 | Pachet et al. ................ 707/5 |
| 2002/0103796 | A1 | * | 8/2002 | Hartley ........................ 707/4 |

(Continued)

FOREIGN PATENT DOCUMENTS

EP 1193616 A1 4/2002

OTHER PUBLICATIONS

Baumann et. al, An Ecological Approach to multimodal subjective music similarity perception, proceedings of the conference on interdisciplinary musicology, Apr. 15, 2004.*

(Continued)

*Primary Examiner* — Angela Lie
*Assistant Examiner* — Fatima Mina

(57) ABSTRACT

Techniques are presented for selecting one or more items from a collection of items. To select the one or more items, an interface is provided that is adapted to allow a user to define one or more weights. Each weight corresponds to one of a number of similarity criteria. Each item also corresponds to the number of similarity criteria. The one or more weights define a similarity function. The similarity function is applied to the one or more similarity criteria corresponding to the one or more weights and to each of the items in order to select one or more items from the collection of items. The interface can comprise movable markers corresponding to similarity criteria. Locations of the movable markers can be used to weight similarity criteria when creating the similarity function.

28 Claims, 9 Drawing Sheets

U.S. PATENT DOCUMENTS

2002/0108484 A1* 8/2002 Arnold et al. .................. 84/615
2002/0181711 A1* 12/2002 Logan et al. ..................... 381/1
2008/0015870 A1* 1/2008 Elowitz et al. .................... 705/1

OTHER PUBLICATIONS

Gowd et al, "Symoblic Clustering Using a New Dissimlarity Measure", Pattern Recognition, vol. 24, No. 6, pp. 567-578 (1991).

El-Sonbaty et al, "Fuzzy Clustering for Symbolic Data", IEEE Transaction on Fuzzy Systems, vol. 6, No. 2, (1998).

Baumann et al, "An Ecological Approach to Multimodal Subjective Music Similarity Perception", Proceedings of the Conference on Interdisciplinary Musicology, Apr. 15, 2004.

* cited by examiner

METHOD AND APPARATUS FOR SELECTING ITEMS FROM A NUMBER OF ITEMS

This application claims the benefit of U.S. Provisional Application Ser. No. 60/568,136 filed May 5, 2004 and, U.S. Provisional Application Ser. No. 60/673,332 filed Apr. 20, 2005.

The present invention relates to computer processing of information, and more particularly, to computer processing of items such as artists, songs, movies, pictures, television shows, and news stories.

When using a computer system, a user may desire to select items from a number of items. For instance, a user might wish to select a playlist of songs from his or her repository of songs. The selected songs could then be played.

When the repository is small, selecting a playlist is quite easy, as there are not that many choices. As the number of songs in the repository grows, however, selecting a playlist can become problematic. For instance, for someone having hundreds or even thousands of songs, it can be hard to remember which songs from which artists are available. Additionally, the process of selecting an artist then selecting a song by that artist can be laborious when a user wants a playlist from multiple artists, especially if the artists and songs are stored in multiple directory structures that have to be perused.

New multimedia programs have helped this process. As an example, certain new multimedia programs can categorize items into media libraries that can then be searched or organized. Additionally, multiple playlists can be saved in the media libraries.

Nevertheless, there are instances when it would be beneficial for a computer system to select items for a user. As an example, when a user is playing a song and would like to hear similar songs, it would be beneficial for a computer system to determine and display the titles of similar songs for the user. A need therefore exists for improved methods and apparatus for selecting items, such as digitally stored songs, from a list of items, so that, for instance, items similar to a pre-selected item may be presented to a user.

Furthermore, a user typically uses an interface when determining what songs to select. When a computer system is going to select songs for the user, the user would like to have some control over what songs are selected. It would be beneficial if the controls for such an interface are simple and relatively easy to understand, yet provide a degree of control over how similar songs are determined.

Generally, methods and apparatus are disclosed that select items from a number of items.

In an exemplary aspect of the invention, techniques are presented for selecting one or more items from a collection of items. To select the one or more items, an interface is provided that is adapted to allow a user to define one or more weights. Each weight corresponds to one of a number of similarity criteria. Each item also corresponds to the number of similarity criteria. The one or more weights define a similarity function. The similarity function is applied to the one or more similarity criteria corresponding to the one or more weights and to each of the set of items in order to select the one or more items from the collection of items.

Thus, a user can define a similarity function, which can be used to select items of interest to the user.

In another aspect of the invention, a user selects a predetermined item of the collection of items. In order to determine items deemed similar to the predetermined item, a similarity value is determined for a given item. The similarity value represents a similarity of the given item with the predetermined item. The determination of the similarity value uses values for each of one or more similarity criteria corresponding to both the given item and the predetermined item. The step of determining a similarity value is repeated until similarity values for each of the plurality of items other than the predetermined item have been determined. This allows a user to be, for instance, presented with items similar to the predetermined item.

A weight may also be determined for each of a number of similarity criteria. The determination of the similarity value can use a combination of weighted values for each of the similarity criteria corresponding to both the given item and the predetermined item. The weighted values are determined using the weights and the values of the one or more similarity criteria.

Similarity values may be determined by histograms of similarity criteria, where the histograms correspond to artists, for instance, such as song writers, television actors, or movie producers.

The items can be, for instance, artists, songs, movies, pictures, television shows, and news stories. Items can be selected based on corresponding values of the similarity values and the selected items can be presented to a user. The similarity criteria can be, for instance, item names (e.g., song names), artist names, activity periods, tempos (e.g., of songs or movies), distributions of song features, beat strengths, genre names, style names, sounds, moods, topics, and director names.

In another exemplary aspect of the invention, an interface region comprises two or more dimensions and is displayed to a user. Markers are located on the interface region and correspond to similarity criteria. Locations on the interface region are determined for the markers. A weight is determined for each of the markers based on a corresponding location of a given marker. Additionally, each weight can be determined based on a distance between the given marker and a predetermined location of the interface region. The determined weights can be used when determining the similarity values.

In another exemplary aspect of the invention, the markers on the interface region are used to modify weights for the similarity criteria to automatically generate a list of songs or other items. The weight for each criterion can be determined by computing the distance between the given marker and a predetermined location of the interface region. The weights of the similarity criteria can determine the number of items, in the automatically generated list, desired by the user for those specific similarity criteria. Thus, the user can have a high degree of control over items in the list, without ever selecting a predetermined item.

A more complete understanding of the present invention, as well as further features and advantages of the present invention, will be obtained by reference to the following detailed description and drawings.

As described above, there are problems with selecting items from a number, e.g., collection, of items. For example, consider the task of manually compiling a playlist of songs. With conventional navigation software, the user selects first the artist, then the album, and eventually the song desired. The process is repeated for each song the user wants to include in the playlist. This does not seem problematic, as it can be clear to the user what music should be in the playlist. However, some people can download so many songs that they are not sure what songs are in their collections. Moreover, even if a user knows all the music in his or her collection, it can be laborious to create playlists, especially if the user wants to vary songs in playlists frequently.

In general, playlists are not arbitrary collections of music. Instead, the music is to some extent coherent with some parameters mentally chosen by the user. Exemplary embodiments of the present invention describe methods and apparatus to help the user build a coherent playlist by presenting to the user relevant information (e.g., similar artists or similar songs) based on an item (e.g., a selected song) selected by the user.

As used herein, an "item" is any type of electronically realizable data, such artists, song, a movie, a picture, a television show, and a news story, or identifiable portions or combinations thereof. The present disclosure describes exemplary embodiments of the present invention in terms of songs and playlists of songs. However, the present invention can be applied to other types of items.

Figure 1:
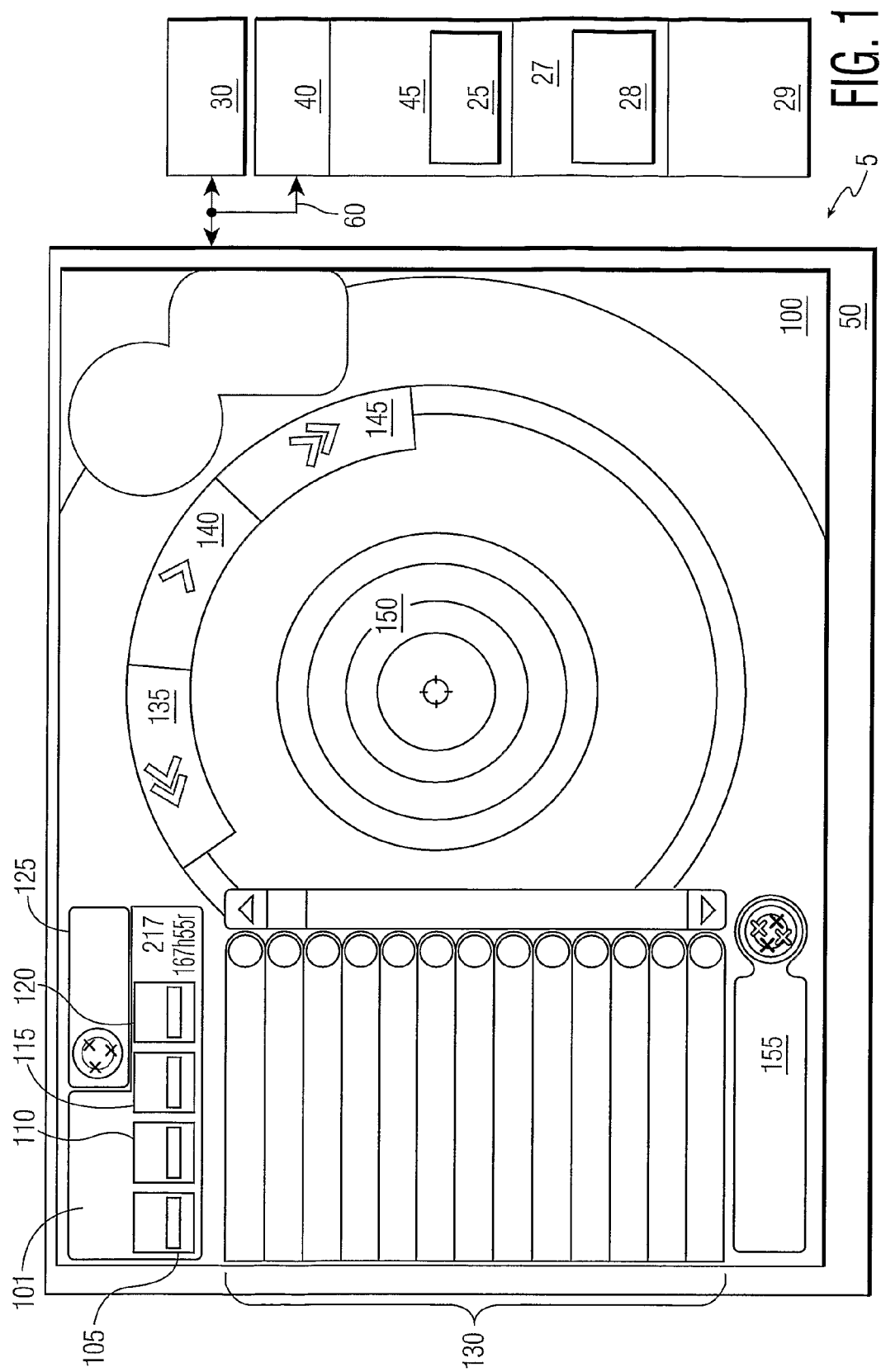
FIG. 1 is a block diagram of a computer system operating in accordance with an exemplary embodiment of the present invention.

Turning now to FIG. 1, a computer system 5 is shown operating in accordance with an exemplary embodiment of the present invention. Computer system 5 comprises a display 50, one or more processors 30, and a memory 40, coupled by bus 60. Memory 40 comprises an item database 45 having similarity criteria tables 25, media 27 having one or more programs 28, and a selection and interface process 29. The display 50 is displaying an interface 100. Interface 100 comprises a browse area 101, a similar area 125, an interface region 150, a rewind button 135, a play button 140, a fast forward button 145, and a playlist 155. Browse area 101 comprises a genre button 105, an artist button 110, an album button 115, and a song button 120. The selection and interface process 29 contains instructions suitable for instructing the one or more processors 30 to carry out some or all of the methods of the present invention. Parts or all of the selection and interface process 29 may be formed, as is known in the art, into one or more programs 28 on media 27. The media 27 can be a program product, such as a compact disk or other storage devices, suitable for holding the one or more programs 28 used to form the selection and interface process 29.

As described in more detail below, the selection and interface process 29 will provide similar items based on an item selected by the user of the computer system 5 and by similarity criteria selected by the user. In the present disclosure, an item selected by a user and used to determine similar items will be called a "predetermined item" in order to distinguish this item from items selected by the selection and interface process 29. The selection and interface process 29 may be divided into multiple processes, if desired. For example, one process could select items similar to a predetermined item, while one process could operate the interface 100.

In FIG. 1, the browse area 101 is selected, as is artist button 110. Artist button 110 causes the playlist 155 to show entries 130 that are artists, in this example, in alphabetical order. Thus, FIG. 1 shows the interface 100 operating in "standard" mode. On the left, there is a list of artists, in entries 155, that have been chosen using standard hierarchical navigation method based on artist. Genre 105, album 115, and song 120 may also be used to select entries 130 in playlist 155. When the user is selecting artists 110 or songs 120 (for example), the similar area 125 is shown. When the similar area 125 is selected (e.g., by clicking on the similar area 125 with a pointer), the interface 100 shows on the left a list of similar artists to those previously selected by the user, as shown in FIG. 2.

Figure 2:
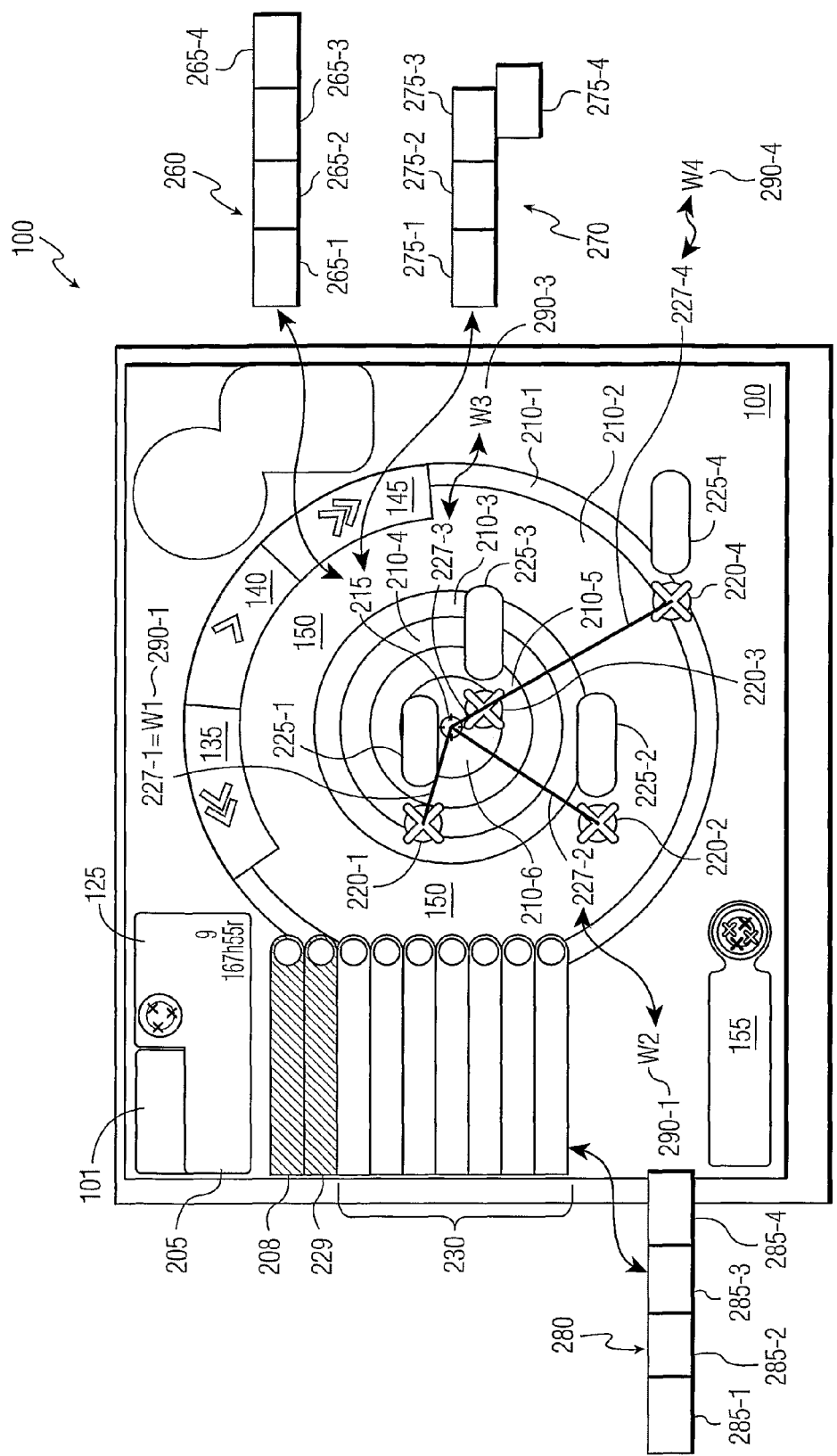
FIG. 2 is an example of the interface shown in FIG. 1 after a similarity operation has been performed, using first similarity criteria, to determine similar artists to a predetermined artist.

FIG. 2 shows the interface 100 of FIG. 1 after the similar area 125 has been selected. The interface region 150 comprises a number of markers 220, each of which corresponds to a similarity criterion 225. The interface region 155 in this example comprises concentric rings 210. The similar area 125 further comprises a songs button 205. The user originally had two predetermined artists 228 (Marvin Gaye) and 229 (Ry Cooder) selected. The predetermined artists 228, 229 are associated with the bulls-eye 215.

Illustratively, the similarity criteria table 260 comprises a sound criterion 265-1, a year criterion 265-2, a mood criterion 265-3, and a genre criterion 265-4. The similarity criteria tables 270 and 280 also comprise similarity criteria 275 and 285, respectively. The similarity criteria 265, 275 and 285 are predetermined by some entity, which could be experts, the user, or a computer system (e.g., through electronic analysis). This means that the user is given a choice of similarity criteria 225 and typically cannot add new similarity criteria 225. However, provisions could be made for the user to add a new similarity criterion 225, if the user can also provide a method to compute the similarity between two items on the basis of this new similarity criterion.

Year criteria 265-2, 275-2, and 285-3 can be, for example, the years in which the artist was active (e.g., from 1982 to 1987). The mood criteria 265-3, 275-3, and 285-3 might be light, romantic, happy, sad, upbeat, or the like. Sound criteria can be based on the analysis of the spectrum of the songs performed by the artists such as that described in Music Summarization System and Method, U.S. Pat. No. 6,633,845, Oct. 14, 2003, the disclosure of which is hereby incorporated by reference. Genre criteria 265-4, 275-4 and 285-4 can be, for instance, jazz, classical, rock, hard rock, rap, popular, teen, or some combination thereof.

Together with the playlist 155 of similar artists, a number of similarity criteria 225 are shown on the right part of the interface 100. Weights 290 can be adjusted by the user for similarity criteria 225 by moving associated markers 220 of the similarity criteria 225 closer or farther from the bulls-eye 215. By changing the relative position of the markers 220 of the similarity criteria 225, the user changes how similarity values are computed as described below. The weights 290 define a similarity function, which may comprise a vector of one or more of the weights. The similarity function is applied to the similarity criteria 225 in order to select similar items. Therefore, the similarity function is user-definable and defines similarity values for items, where the items can be selected by using the values. An appropriate list of similar artists is determined on the left in playlist 155. Thus, the interface 100 provides a degree of control for the user over what similar artists (or other items) are presented to the user.

In an exemplary embodiment of the present invention, an interface distance 227 is determined for each marker 220. The interface distance 227 is a number determined by determining a distance from a marker 220 to the bulls-eye 215. Bulls-eye 215 is a location in this example but can also be a point on the interface region 150. As there are concentric rings 210 in the interface region 150, each concentric ring 210 could be assigned a particular interface distance 227. For instance, the marker 220-1 for the criterion sound 225-1 could have an assigned interface distance 227-1 of three, the marker 220-1 for the criterion year 225-2 could have an assigned interface distance 227-2 of five, and the criterion mood 225-3 could have an interface distance 227-3 of one. Thus, the concentric rings 210-1, 210-2, 210-3, 210-4, 210-5, and 210-6 could have assigned interface distances 227 of six, five, four, three, two, and one, respectively. Additionally, a marker can be placed on or in bulls-eye 215, so the bulls-eye 215 could be assigned an interface distance 227 of zero. Alternatively, linear distance on the interface region 150 could be used to assign an interface distance 227. Therefore, the interface distance 227-1 could be assigned a value of one inch, while the interface distance 227-2 could be assigned a value of 1.8 inches.

The interface distances 227-1, 227-2, 227-3, and 227-4 are converted to weights $w_1$ 290-1, $w_2$ 290-2, $w_3$ 290-3, and $w_4$ 290-4, respectively. The weights 290 are used to modify unweighted similarity criteria, such as similarity criteria 265, 275 and 285, when determining which artists (in the example of FIG. 2) are similar to one or both of the artists 228, 229. The mood similarity criterion 225-3 is positioned by the user (e.g., by positioning the corresponding marker 220-3 close to the bulls-eye 215) so that this similarity criterion is weighted higher than the similarity criteria 225-1 and 225-2.

Illustratively, the concentric rings 210-1, 210-2, 210-3, 210-4, 210-5, and 210-6 could have assigned interface distances 227 of six, five, four, three, two, and one, respectively. The interface distances 227 of six, six, five, four, three, two, and one could be converted to weights 290 of zero, one, two, three, four, five, and six, respectively. Additionally, a marker can be placed on or in bulls-eye 215, so the bulls-eye 215 could be assigned an interface distance 227 of zero and a corresponding weight of seven. It should be noted that locations of the markers 220 can be converted directly to weights 290, if desired. Also, weights could be less than or equal to one, if desired, such that a weight of one equates with a marker 220 being on the bulls-eye 215 (for instance), while each concentric ring 210 would differ by 0.167 (e.g., ring 210-6 would have an assigned weight of 0.833). It should be noted that the weights could be assigned non-linearly, so that a distance of 0.5 inches could be assigned a value of 10 (for example), while interface distances on the interface region 150 of 1.0 and 1.5 inches could be assigned a value of one and 0.1, respectively.

Figure 5:
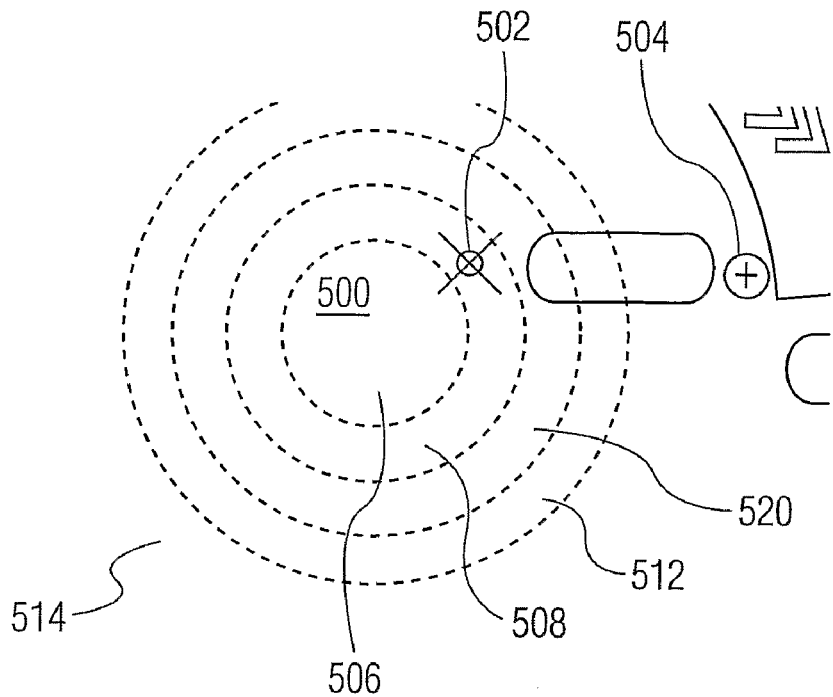
FIG. 5 is another example of an interface used to automatically generate a playlist, the interface having a single marker.

As explained in reference to FIG. 5, the weights 290 are used when determining a similarity value used to select similar artists (in the example of FIG. 2). For instance, for the artist Madonna A an exemplary similarity measure with another artist B would be the following:

$$s(A,B)=s(sound_A,sound_B),s(year_A,year_B),s(mood_A,mood_B), \qquad (1)$$

where each $s(\bullet)$ is a similarity function that uses a corresponding weight 290, and s(A,B) is a similarity value produced by the similarity measure of Equation 1. Alternatively, the $s(\bullet)$ could be modified by a corresponding weight, as shown below in reference to FIG. 5. Typically, the entries are presented in a descending order, so that the entry "George Michael" is more similar than the entry "Madonna" to the predetermined songs 228, 229. However, descending order (or any order) is not necessary. Additionally, generally only a number of most similar (e.g., as determined by the similarity measure of Equation 1) items, such as artists or songs, will be shown in the playlist of interface 100. For example, the top 10 most similar items can be displayed. Nonetheless, all items could be displayed (with accompanying similarity value, if desired).

Although the interface region 150 is shown having two dimensions, it should be noted that the interface region 150 could also have more or fewer dimensions, e.g., three dimensions.

It should also be noted that, in another exemplary embodiment, the playlist 155 of similar artists can be displayed (e.g., instead when clicking the similar area 125) at any time the user selects one or more artists, and that the criteria for similarity can be displayed contextually to the playlist 155 or used as user preference and showed only at user request.

Figure 3:
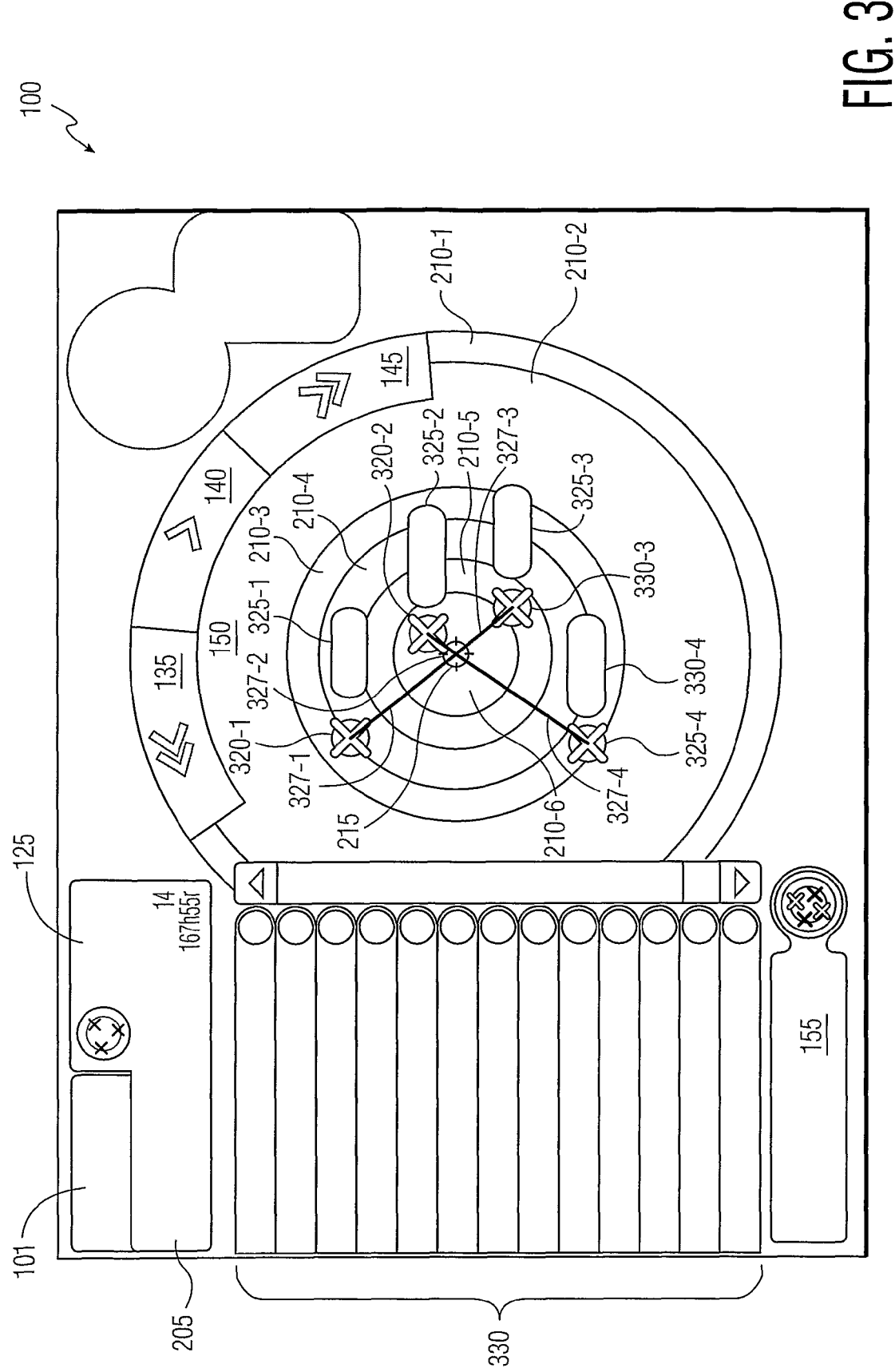
FIG. 3 is another example of the interface shown in FIG. 1 after a similarity operation has been performed, using second similarity criteria, to determine similar songs to a predetermined song.

Turning now to FIG. 3, another example of the interface 100 of FIG. 1 is shown after a similarity operation has been performed, using similarity criteria 325, to determine similar songs to a predetermined song. In this example, the song 329, "Baba," was used as a predetermined item, e.g., to define the similarity criteria associated with the bulls-eye 215. The similarity criteria 327 are sound 327-1, tempo 327-2, mood 327-3, and year 327-4. The tempo criterion 327-2 can be determined through computer analysis, expert opinion, or user opinion. The corresponding interface distances 327-1 through 327-4 are determined illustratively by comparing markers 325-1 through 325-4 with bulls-eye 215. Corresponding weights (not shown in FIG. 4) are determined for the interface distances 327-1 through 327-4. Alternatively, the locations of the markers 320 can be used to determine the interface distances 327.

Using the markers 320, set by the user for the similarity criteria 325, the system 100 (see FIG. 1) has determined that the playlist 155 comprises entries 330. In the example of FIG. 3, the playlist 155 comprises songs in entries 330.

One of the advantages of selecting artists or songs, as in FIGS. 2 and 3 respectively, is in how easy it is for a user to weight the similarity criteria 225 or 325 and in the perception of control that the user receives with respect to a system where the definition of similarity is not used.

Figure 4:
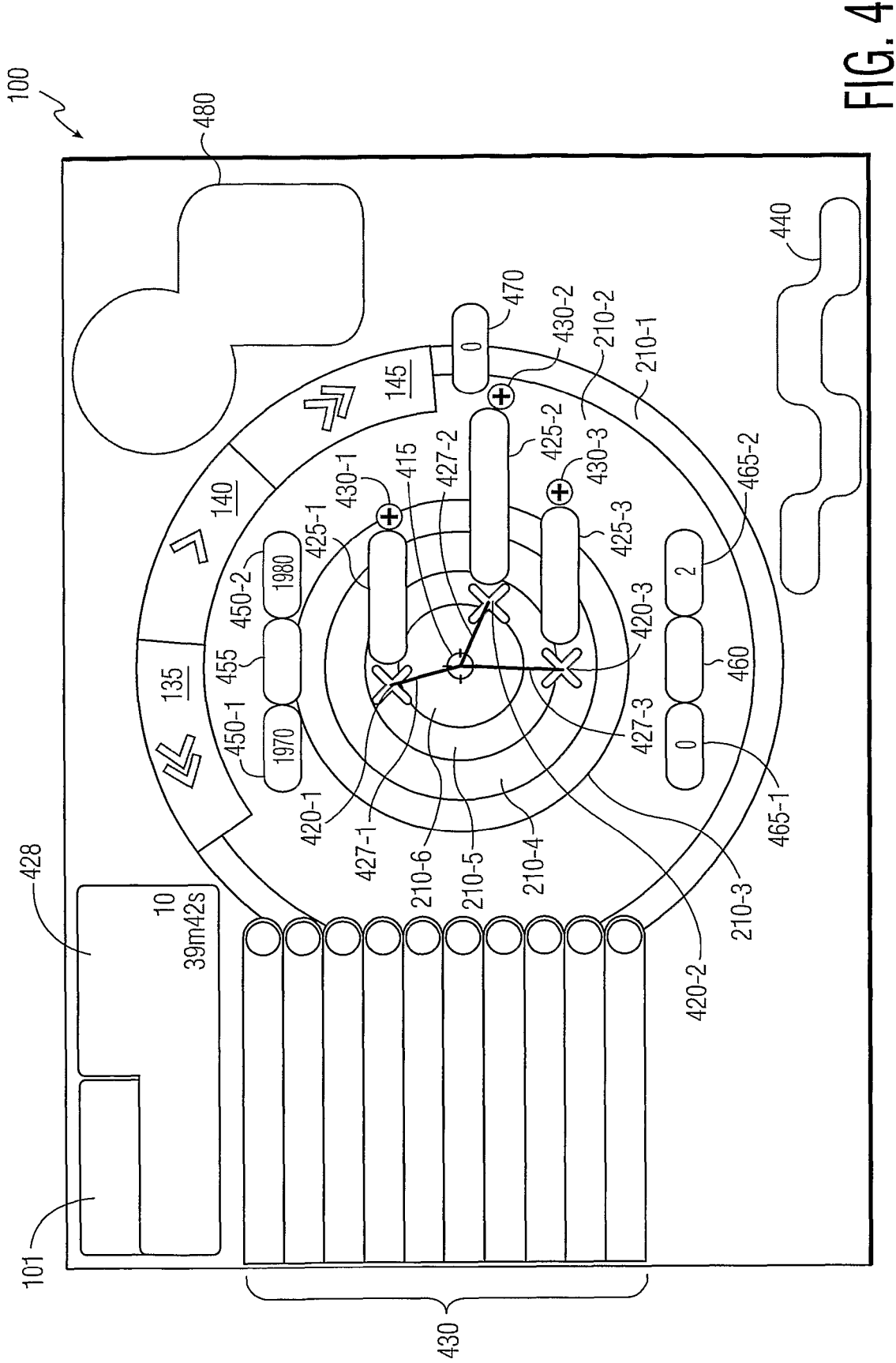
FIG. 4 is an example of an interface used to automatically generate a playlist.

FIG. 4 is another example of the interface shown in FIG. 1. In this case, the criteria 425 are not similarity criteria, but selection criteria which may be selected by the user from the available genres, artists, and albums. In the example, the user has selected artists Michael Jackson 425-2 and Marvin Gaye 425-3 and genres Soul+R&B+Rap 425-1 as selection criteria 425 to generate the playlist. In the example, Michael Jackson 425-2 is weighted more (closer to the bulls-eye 415) than Marvin Gaye 525-3. This can be seen by interface distances 427-2 and 427-3, respectively. Genres Soul+R&B+Rap 425-1 is weighted more than Marvin Gaye 425-3, as shown by interface distances 427-1 and 427-3, respectively. In this example, weighting is based on interface distance (e.g., and not based on having a marker 420 occur in a concentric ring). The criteria can be positive respectively shown in 430-2, 430-3, 430-1 or negative. Two other criteria can be selected by the user: year 445 (between year 450-1, 1970, and year 450-2, 1980, in this example) and tempo 460 (between a tempo 465-1 of zero and a tempo 465-2 of two).

On the basis of the selected criteria, a playlist 430 can be generated using a selection function which schedules the songs into a playlist (of duration determined by the user), e.g., from all songs in the user's collection. See, for example, international application WO 2004/057495, the disclosure of which is hereby incorporated by reference, wherein constraint satisfaction is used to select items for a playlist. See also, for example, European Patent No. 1,193,616 entitled "Fixed-Length Sequence Generation of Items Out of a Database Using Descriptors," (hereinafter, EP119616), the disclosure of which is hereby incorporated by reference. EP119616 discloses conventional methods for playlist generation, for example, EP119616 discloses a method of generating sequencing information representing a sequence of items selected in a database, each of the items comprising a set of descriptors, characterized in that the method comprises the steps of: a) specifying a length of said sequence and at least one of said descriptors; b) applying similarity relation techniques between said items; and c) generating a fixed-length sequence having a morphological continuity. The weights for the similarity criteria 425 can be used, for instance, when applying similarity relation techniques to the items (e.g., described by similarity criteria tables for the items). The similarity criteria are thus constraints and are weighted by weights in a user-defined similarity definition. The fixed-length sequence would then be used to select similar items.

Other selection criteria such as album names can also be used. FIG. 4 also shows an additional menu 440 to the user to save, load, flip, or reset similarity criteria.

According to an exemplary embodiment, a playlist 430 is generated using a user interface similar to, for example, interface region 150 in FIG. 1. For example, interface region 500, shown in FIG. 5, consists of a set of concentric circles having different radii, but the same origin. A user of interface region 500 can, at his or her discretion, place playlist marker(s), e.g., playlist marker 502, in this set of circles.

According to this embodiment, each playlist marker comprises a structure with three parameters. First, each playlist marker has at least one polar coordinate expressed in an inverted normalized radial component r between 1.0 and 0.0 and an angle component phi. Second, each playlist marker has a song attribute value attached to it. Third, a sign, e.g., sign 504, indicating whether songs with the given attached song attribute value should be present in the playlist (e.g., a '+' indicating the song should be in the playlist and a '−' indicating the song should not be in the playlist) is attached to each playlist marker.

When a single playlist marker is present, such as single playlist marker 502, the inverted normalized radial distance, e.g., (1−r), of the playlist marker to the origin represents the desired cardinality of the attached song attribute value. The angle component of the playlist marker has no effect on the playlist generation.

Using this method, inner circle 506 of interface region 500 represents desired cardinalities between 100 percent and 80 percent, circle 508 of interface region 500 represents desired cardinalities between 80 percent and 60 percent, circle 510 of interface region 500 represents desired cardinalities between 60 percent and 40 percent, circle 512 of interface region 500 represents desired cardinalities between 40 percent and 20 percent and outer circle 514 of interface region 500 represents desired cardinalities between 20 percent and zero percent.

As shown in FIG. 5, a desired cardinality of about 70 percent popular music is requested. Thus, the remaining 30 percent is left unspecified. It is important to note that sign 504 presents a '+.' If, however, sign 504 had presented a '−,' this would mean that no (e.g., zero percent) popular music is desired, irrespective of the position of playlist marker 502.

Figure 6:
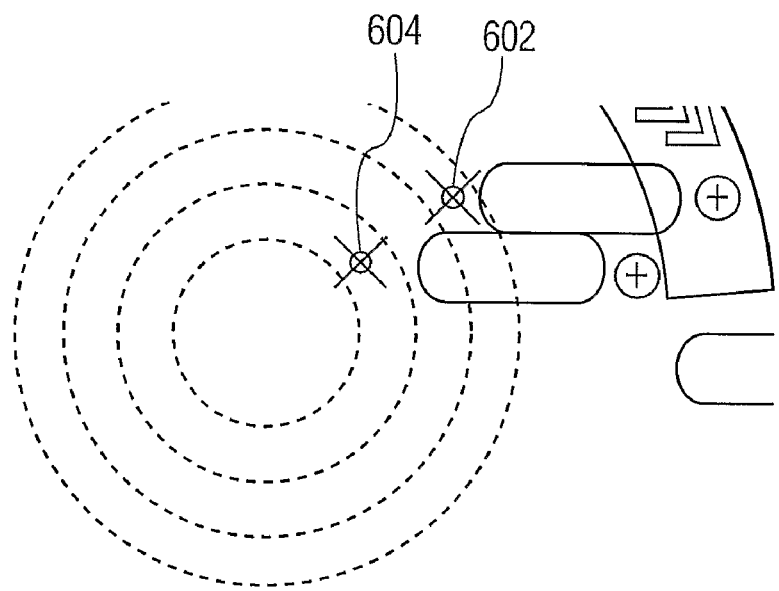
FIG. 6 is another example of an interface used to automatically generate a playlist, the interface having two markers representing the same criteria.

In FIG. 6, two playlist markers, e.g., 602 and 604, are present. If two playlist markers are present that represent the same criteria (e.g., musical genre), the inverted normalized radial distances of the two playlist markers are compared with each other to arrive at the desired cardinalities. The closer a playlist marker is to the origin (e.g., the smaller the radial distance), the higher the cardinality. Again, the angle components do not have any effect. As shown in FIG. 6, the desired cardinalities for popular music and rock music are about 70% and 30%, respectively.

The desired cardinality (in a proportional number so as to have an integer), for example, for rock music is computed according to, $$\text{card} = \frac{1 - r_{rock}}{2 - r_{rock} + r_{popular}}$$

wherein each r represents the normalized radial distances.

If playlist markers represent multiple attributes (e.g., musical genres and artists), the hierarchical structure of genre first, then artist, then album and then song is considered to arrive at a value for the desired cardinalities. Specifically, all the desired cardinalities for the genres involved are first calculated. Then the cardinalities for the artists involved are calculated, and so on. Further, since each artist belongs to a genre, for example, Pink Floyd belongs to the genre rock, if the cardinality for an artist, such as Pink Floyd, is at least five, then the cardinality for the genre rock is also at least five.

Figure 7:
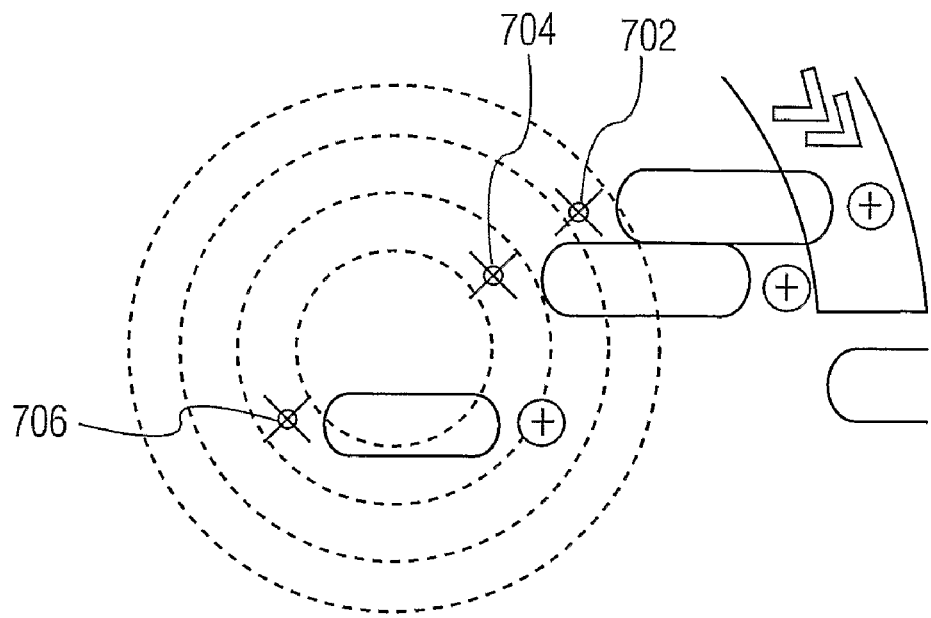
FIG. 7 is another example of an interface used to automatically generate a playlist, the interface having multiple markers representing multiple criteria.

For example, in FIG. 7, only rock and popular genres and artist Abba are involved, e.g., as represented by markers 702, 704 and 706, respectively. Abba is a group that recorded popular music. The configuration shown in FIG. 7 reflects that about 70 percent of Abba's music should account for the popular music in the playlist, as computed by 1−r. This means that about 50 percent of the complete playlist will be filled with music by Abba, about 30 percent will be filled with rock music and about 20 percent will be filled with popular music from unspecified artists.

Figure 8:
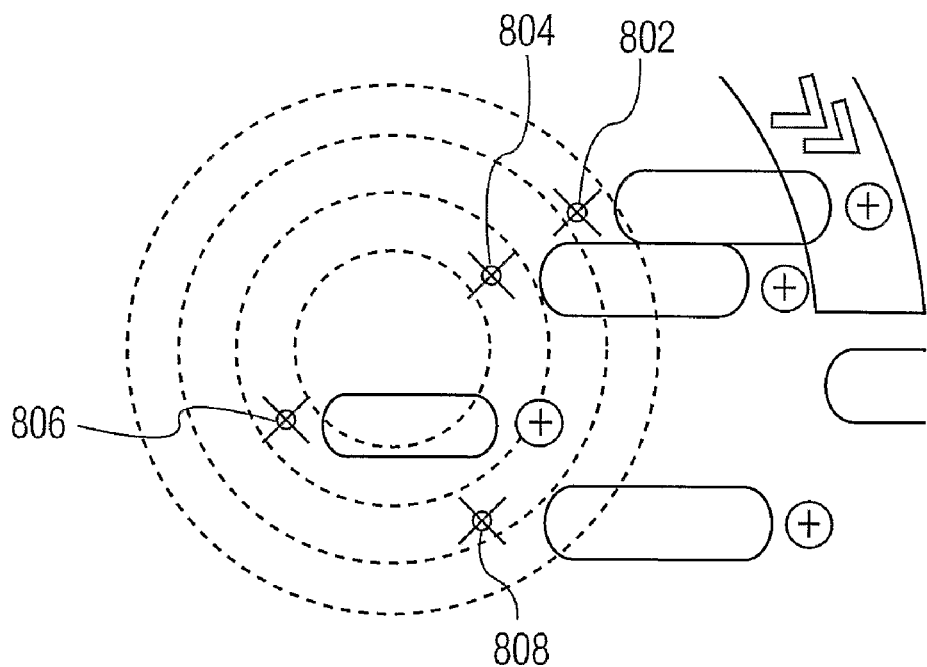
FIG. 8 is another example of an interface used to automatically generate a playlist, the interface having multiple markers representing multiple criteria and with two markers representing the same criteria.

In another exemplary configuration, for example, as shown in FIG. 8, another artist, Britney Spears, is added. Thus, the four markers, 802, 804, 806 and 808 are present representing rock, popular, Abba and Britney Spears, respectively. Since both Abba and Britney Spears belong to the popular genre, their radial distances are compared. As a result, it can be determined that the user desires that the playlist contain about 60 percent music by Abba and about 40 percent music by Britney Spears under the genre popular music and about 30 percent music under the genre rock music.

Figure 9:
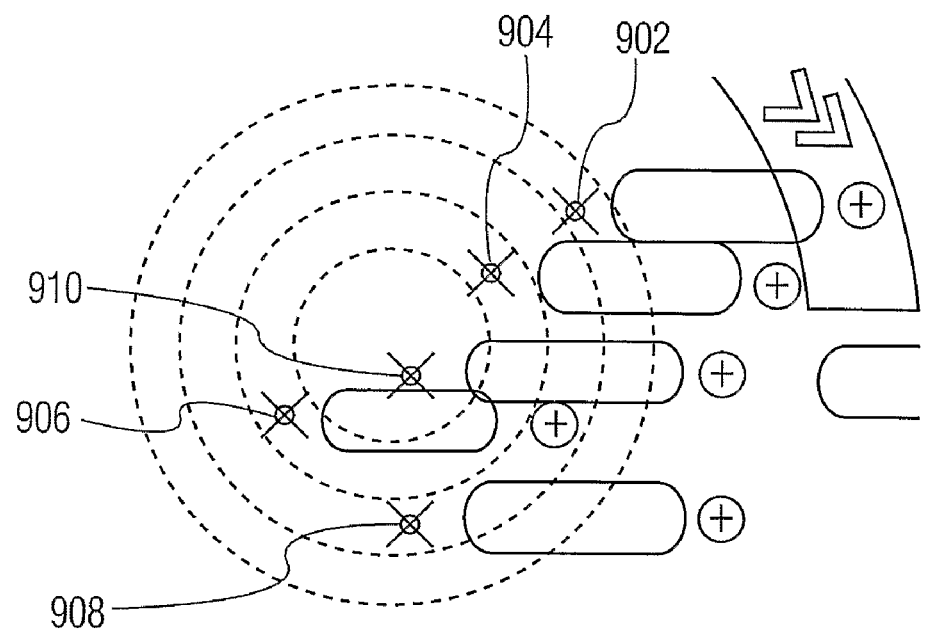
FIG. 9 is another example of an interface used to automatically generate a playlist.

In FIG. 9, an additional artist, Queen, is added to the configuration. Thus, the markers, 902, 904, 906, 908 and 910 are present representing rock, popular, Abba, Britney Spears and Queen, respectively. The addition of Queen to the playlist only has an effect on the genre rock music in the playlist. Specifically, about 90 percent of the rock music should be from Queen. The angle component of the polar position of the markers has no effects on the cardinality computation, only the distance from the origin matters. Therefore, users may group the markers for easy understanding, if so desired.

Figure 10:
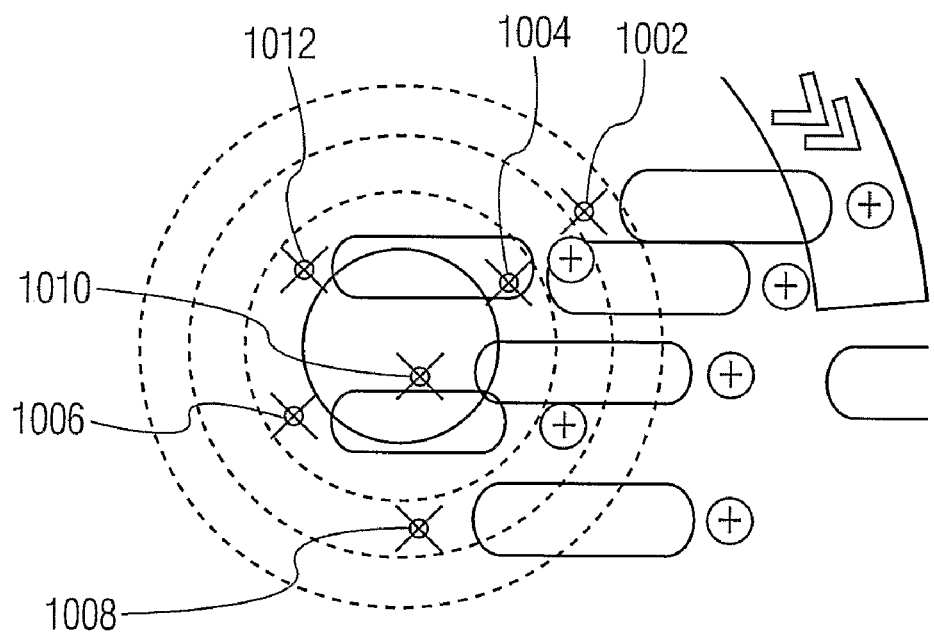
FIG. 10 is another example of an interface used to automatically generate a playlist, the interface having a phantom marker.

It is also possible to add an artist in the configuration that is not covered by a musical genre. For example, in FIG. 10, the band Doe Maar, which plays Nederlandstalige music, is added. Thus, the markers 1002, 1004, 1006, 1008, 1010 and 1012 are present representing rock, popular, Abba, Britney Spears, Queen and Doe Maar, respectively. As cardinality propagates up to the level of genre (e.g., as described above, if Britney Spears belongs to the genre popular, and if at least three songs from Britney Spears are desired, then at least three songs from the genre popular are desired), a phantom playlist marker is created for the genre Nederlandstalige at the same position as Doe Maar marker 1012. Thus, the radial distance of the phantom playlist marker from the origin is about the same as the radial distance for the playlist marker for popular music.

Comparing the radial distances of the playlist markers 1012, 1004 and 1002, desired cardinalities of about 40 percent, 40 percent and 20 percent for the genres Nederlandstalige, rock and popular, respectively, are determined. About 70 percent of the music in the playlist should be Nederlandstalige music from the band Doe Maar.

Figure 11:
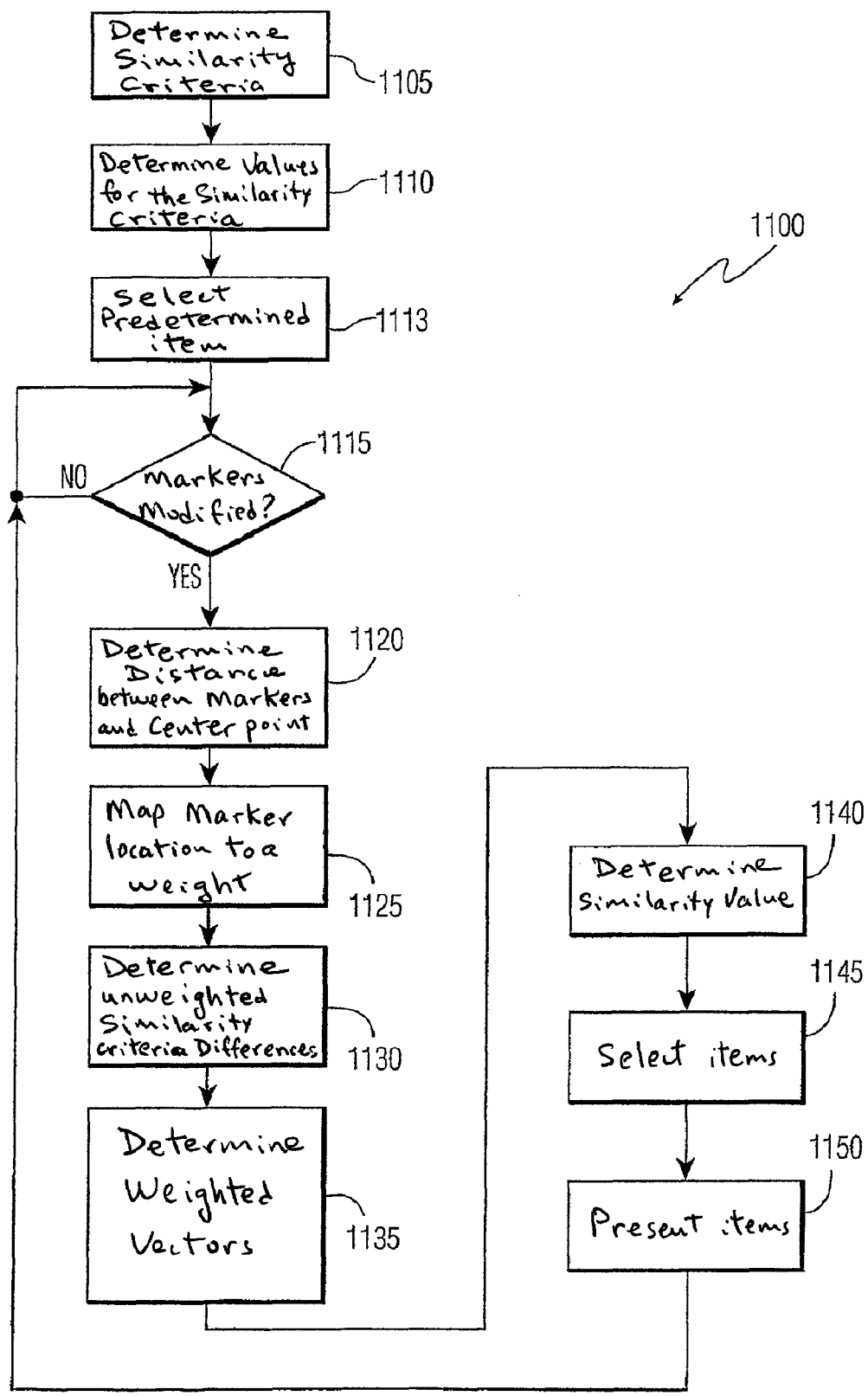
FIG. 11 is a flowchart of a method used to determine items similar to a predetermined item, in accordance with a preferred embodiment of the invention.

Turning now to FIG. 11, an exemplary method 1100 is shown that is used to select items from a plurality of items. Method 1100 starts in step 1105 when the similarity criteria is determined for each item. Exemplary similarity criteria have been described above. Typically, a set number of similarity criteria are determined and are available for each item. As described above, optionally a user could add a similarity criterion. In step 1110, values for each of the similarity criteria for each of the items are determined. This determination can be through user input, computer system analysis, expert input, or through any other technique.

After step 1110 has been performed, then each item should have a similarity criteria table having values for each similarity criterion. In step 1113, the user selects an item, which is called the predetermined item. Step 1113 is optional. For example, in the method described above, for example, in reference to FIG. 4, there is no predetermined item selected. It should be noted that step 1130 may be performed at this point. In step 1115, it is determined if markers on the interface region have been modified. The first time the interface is run, markers will generally be preassigned, typically so that the markers have the same weighting, although this is not necessary. If the markers have not been changed (step 1115=NO), then method 1100 waits.

When one or more of the markers have been changed (step 1115=YES), then interface distances are determined between the markers and a center point on the interface region in step 1120. In step 1125, the interface distances are weighted and a corresponding similarity function is determined. Typically, step 1125 is performed so that markers nearer the location on the interface region corresponding to the predetermined item have higher weights than markers farther from the location. Note that step 1120 could simply determine a location of a marker (e.g., inside a concentric ring) and step 1125 would then map the location to a weight. A similarity function could then be $\{w_1, w_2, w_3\}$. It should be noted that there might be N similarity criteria, but a similarity function might have less than N values for only the weighted similarity criteria or have zero values for unweighted similarity criteria. Also, the similarity function might be more complex and contain additional information such as similarity criteria references.

In step 1130, unweighted similarity criteria differences are determined. In the example of Equation 1, the difference vector:

$$s(sound_i, sound_{pd}), s(year_i, year_{pd}), s(mood_i, mood_{pd}),$$

has three entries of unweighted similarity criteria differences for the ith the item as compared to the predetermined (pd) item. Typically, there are (i−1) unweighted similarity criteria difference tables, one for each item other than the predetermined item. In step 1135, corresponding weights are applied using the similarity function to the unweighted similarity criteria differences, which results in this example of a weighted vector of:

$$w_{1i}s(sound_i, sound_{pd}), w_{2i}s(year_i, year_{pd}), w_{3i}s(mood_i, mood_{pd}),$$

where $w_{1i}$ is the weight corresponding to the sound similarity criterion, $w_{2i}$ is the weight corresponding to the year similarity criterion, and $w_{3i}$ is the weight corresponding to the mood similarity criterion. It should be noted that the weights may be applied to each similarity criterion first, then a difference can be determined, which will result in a weighted vector. Step 1135 is typically performed until all (i−1) weighted vectors are determined. In step 1140, a similarity value, $s_i$, is determined through:

$$s_i = w_{1i}s(sound_i, sound_{pd}) + w_{2i}s(year_i, year_1) + w_{3i}s(mood_i, mood_{pd})$$

and is determined for each (i−1) combination of item and predetermined item. Note that the similarity measure can use an absolute value so that only positive values are used. Also, the similarity measures used to determine similarity values shown above are merely exemplary and other similarity measures may be used. What is important is that a similarity measure be used that is able to determine similar items using numeric or non-numeric information.

With N artists in a collection, there are $N^2$ distances. It is not to be assumed that the distance from artist A and artist B would be the same as the distance from artist B and artist A. These distances can be stored into a table, and whenever the user selects an artist, the table may be scanned to find the closest artists. Algorithms to find distances using symbolic data are well known in the art. For instance, see Gowda and Diday, "Symbolic Clustering Using a New Dissimilarity Measure," Pattern Recognition, vol. 24, num. 6, 567-578 (1991) and El-Sonbaty and Ismail, "Fuzzy Clustering for Symbolic Data," IEEE Transaction on Fuzzy Systems, vol. 6, num. 2 (1998), the disclosures of which are hereby incorporated by reference. According to an exemplary embodiment, a similarity of 0.1 is assigned when the two items share the same value, and a similarity of 0.0 is assigned when the two items have different values (e.g., if Genre Artist A='rock,' Genre Artist B='rock' and Genre Artist C='pop,' then the similarity, with respect to Genre, for Artist A and Artist B is 1.0 and the similarity, with respect to Genre, for Artist A and Artist C is 0.0.

In step 1145, items are selected. This step could be performed, for example, by ranking the items using the similarity values and selecting a predetermined number of the items or selecting those items within a predetermined distance of a predetermined item or meeting constraints, as described above in reference to FIG. 4. In step 1150, the items are presented to the user, such as part of a playlist.

It should be noted that if multiple predetermined items are selected, similarity measures can be computed for each of the predetermined items using steps of method 1100.

Figure 12A:
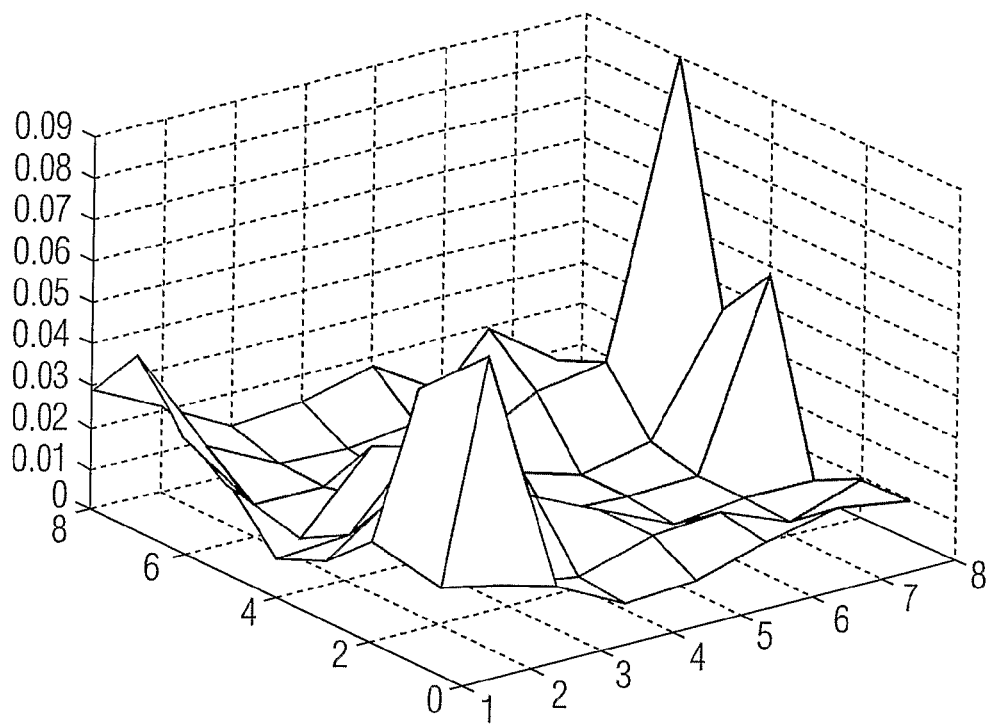
FIG. 12A is a graph showing a distribution of songs in an exemplary feature space for the artist "Pearl Jam"
Figure 12B:
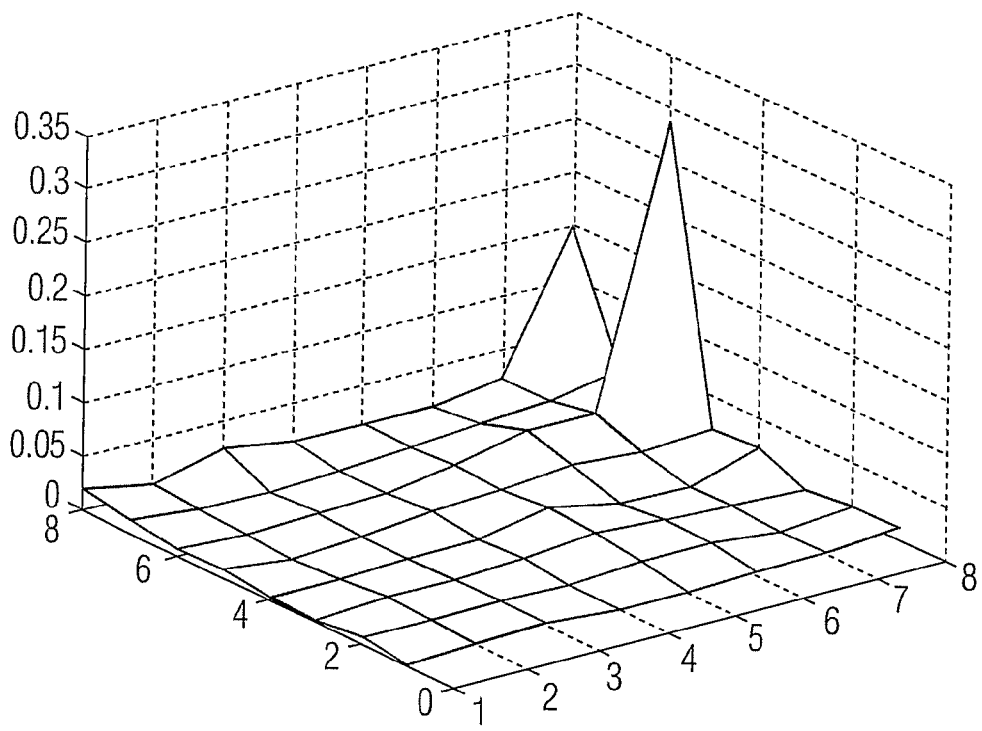
FIG. 12B is a graph showing a distribution of songs in an exemplary feature space for the artist "Abba."

In method 1100, such as in step 1140, similarity of two artists (according to the sound criterion) can be defined based on the features extracted from their songs. The similarity is defined for each couple of artists. Each song in the collection is processed to obtain feature vectors $v_c$, e.g. "standard" Mel Frequency Cepstrum Coefficients (MFCCs) could be used. The $v_c$ are "whitened" and quantized with a P×Q Self-Organizing map (SOM) as described in Kohonen, T., "Self-Organizing Maps," Springer, N.Y., 2nd edition, 1995. For each artist $A_i$ belonging to the collection, a 2-D histogram, $H_i:P \times Q \rightarrow R$, is computed by accumulating the response of the SOM to the feature vectors $v_c$ of the songs performed by that artist. In FIGS. 12A and 12B, the histograms computed for two different artists (Pearl Jam and Abba, respectively) are shown.

For each artist, the histogram can be regarded as a probability distribution of the songs in the feature space. One can define the similarity $s(A_i,A_j)$ between two artists $A_i$ and $A_j$ as:

$$s(A_i, A_j) = \sum_{h=0}^{P} \sum_{k=0}^{Q} \min(H_i(h,k), H_j(h,k)), \quad (2)$$

where P and Q are values for the number of histogram entries for the X and Y axes, respectively, H(h,k) is a value of a histogram at the point (h,k), and min is a function that produces a minimum value between $H_i(h,k)$ and $H_j(h,k)$. A reason for adopting this similarity measure is because the similarity measure is computationally cheap. However, note that the framework and the techniques proposed herein do not impose any constraint on the choice of the similarity measure.

The same concept can be used to measure the similarity between two artists based on their mood, for instance. In this case, the histogram for artist A is computed accumulating the mood for each song performed by said artist A. Again, the concept can be extended further to, e.g., year and tempo.

It is to be understood that the embodiments and variations shown and described herein are merely illustrative of the principles of this invention and that various modifications may be implemented by those skilled in the art without departing from the scope and spirit of the invention. For instance, there could be two locations on the interface region, each location corresponding to a predetermined item.

The invention claimed is:

1. A method for selecting one or more items from a collection of items, the method comprising the acts of:
providing a system comprising a memory and at least one processor:
providing by the at least one processor an interface adapted to allow a user to assign one or more weights corresponding to one of a plurality of criteria associated with at least one of the items, one or more of the weights defining a similarity function;
applying the similarity function to the plurality of criteria and to each of the items in order to select one or more items from the collection of items;
providing an interface region comprising at least two movable markers movable by the user;
determining a location for each of the at least two movable markers on the interface region comprising two or more dimensions, each movable marker corresponding to one of the plurality of criteria, wherein a first movable marker corresponds to a first criterion for changing a weight of the similarity function based on a location of the first movable marker, wherein a first marker of the at least two movable markers is movable in a first direction and a second marker of the at least two movable markers is movable in a second direction, wherein the first direction is not parallel to the second direction;
assigning, based on a first location of the first movable marker, the weight for the similarity function corresponding to the first location;
selecting the one or more items from the collection of items based on the weight of the similarity function as determined from the first location of the first movable marker.

2. The method of claim 1, wherein the plurality of criteria comprise similarity criteria.

3. The method of claim 1, further comprising the act of selecting by the user a predetermined item from the collection of items, wherein the act of applying the similarity function further comprises the acts of:
determining a similarity value for a first one of the items, wherein each item is associated with values for each of a plurality of criteria, the similarity value representing a similarity of the first item with the predetermined item, the determination of the similarity value using weighted values for each of one or more criteria corresponding to both the first item and the predetermined item, wherein the weighted values are determined using the similarity function; and
repeating the act of determining a similarity value until similarity values for each of the items other than the predetermined item have been determined.

4. The method of claim 1, wherein one or more of the plurality of criteria comprise one or more of mood, tempo, year, and feature vectors for songs.

5. The method of claim 3, wherein the act of determining a similarity value further comprises the act of determining a similarity value using at least two or more histograms, each histogram representing a plurality of values corresponding to one of the plurality of criteria.

6. The method of claim 5, wherein a similarity value $s(A_i, A_j)$ between two items $A_i$ and $A_j$ is:

$$s(A_i, A_j) = \sum_{h=0}^{P} \sum_{k=0}^{Q} \min(H_i(h,k), H_j(h,k)),$$

where P and Q are values for the number of histogram entries for X and Y axes, respectively, H(h,k) is a value of a histogram of one of the plurality of similarity criteria at the point (h,k), and min is a function that produces a minimum value between $H_i(h,k)$ and $H_j(h,k)$, and wherein a weight 290 from a similarity definition can be applied to the similarity value.

7. The method of claim 6, wherein the two items $A_i$ and $A_j$ represent artists.

8. The method of claim 6, wherein the two items $A_i$ and $A_j$ represent artists, and the similarity value $s(A_i, A_j)$ represents a similarity between artists $A_i$ and $A_j$, defined, at least in part, by features extracted from songs of the artists $A_i$ and $A_j$.

9. The method of claim 6, wherein the two items $A_i$ and $A_j$ represent artists, and the similarity value $s(A_i, A_j)$ represents a similarity between artists $A_i$ and $A_j$, defined, at least in part, by a mood of each of the artists $A_i$ and $A_j$.

10. The method of claim 1, wherein the plurality of criteria comprise one or more of the following: item name; artist name; activity period; distribution of song features; beat strength; genre name; style name; sound; topic; and director name.

11. The method of claim 3, wherein:
the act of providing an interface further comprises the act of determining a weight for each of one or more of the plurality of criteria; and
the act of the determining a similarity value uses a combination of weighted values for each of the one or more criteria corresponding to the first item and the predetermined item, the weighted values determined using the similarity function and the values of the one or more criteria.

12. The method of claim 11, wherein:
the predetermined item is a first predetermined item;
one or more additional predetermined items are chosen; and
the acts of determining a weight, determining a value and repeating are performed using each of the one or more additional predetermined items.

13. The method of claim 12, further comprising the acts of:
selecting one or more of the items based on corresponding ones of the similarity value for each of the first and one or more additional predetermined items; and
presenting the selected one or more items to the user.

14. The method of claim 3, further comprising the acts of:
selecting the one or more items based on corresponding ones of the similarity values; and
presenting the selected one or more items.

15. The method of claim 14, wherein:
the act of selecting further comprises the act of selecting a predetermined number of items closest, as determined by corresponding ones of the similarity values, to the predetermined item; and
the act of presenting further comprises the act of displaying names for the predetermined number of items.

16. The method of claim 14, wherein:
each of the items comprises songs;
the act of selecting further comprises the act of selecting a playlist comprising at least a predetermined number of songs closest, as determined by corresponding ones of the similarity values, to the predetermined song; and
the act of displaying further comprises the act of displaying at least a portion of the playlist.

17. The method of claim 14, wherein:
each of the items comprises artists;
the act of selecting further comprises the act of selecting a list comprising at least a predetermined number of artists closest, as determined by corresponding ones of the similarity values, to the predetermined artist; and
the act of displaying further comprises the act of displaying at least a portion of the list.

18. The method of claim 1, wherein each of the items comprises one or more of the following: artists, songs, movies, pictures, television shows, and news stories.

19. The method of claim 1, further comprising the act of associating a predetermined location on the interface region with a user selected item selected from the one or more items from the collection of items, wherein weights are assigned so that assigned weights increase as a distance between the first location and the predetermined location decreases.

20. The method of claim 1, wherein the act of providing the interface further comprises the acts of:
associating a predetermined location on the interface region with a user selected item selected from the one or more items from a collection of items;
determining a distance between the first location and the predetermined location on the interface region; and
assigning a weight to a corresponding one of the criteria based on the first location.

21. The method of claim 20, wherein the predetermined location corresponds to a predetermined item.

22. The method of claim 11, wherein the act of determining a similarity value further comprises the acts of:
for each of the one or more criteria:
determining a value for the similarity function between a value for a selected criterion for the first item and between a predetermined value for the selected criterion for the predetermined item; and
applying a weight corresponding to the selected criterion to the value of the similarity function.

23. The method of claim 1, wherein each of the plurality of criteria corresponding to the weights also corresponds to a constraint, and wherein the act of applying the similarity function further comprises the acts of:
applying weights from the similarity function to the constraints;
applying similarity relationship techniques, using the weighted constraints, between the items; and
generating a fixed-length sequence suitable for selecting the one or more items.

24. The method of claim 23, wherein the method further comprises the acts of:
using the fixed-length sequence suitable to select a list comprising the one or more items; and
presenting the list to the user.

25. The method of claim 1, further comprising the acts of:
adding a method to determine a new criterion; and
using the method to determine values of the new criterion for each of the items.

26. A system for selecting one or more items from a collection of items, the system comprising:
a memory for storing the collection of items, a plurality of criteria, and one or more weights; and
at least one processor, coupled to the memory, operative to perform the acts of:
providing an interface adapted to allow a user to assign the one or more weights to one of the plurality of criteria associated with at least one of the items, one or more of the weights defining a similarity function;
applying the similarity function to the plurality of criteria and to each of the items in order to select one or more items from the collection of items;
providing an interface region comprising at least two movable markers movable by the user;
determining a location for each of the at least two movable markers on the interface region comprising two or more dimensions, each movable marker corresponding to one of the plurality of criteria, wherein a first movable marker corresponds to a first criterion for changing a weight of the similarity function based on a location of the first movable marker, wherein a first marker of the at least two movable markers is movable in a first direction and a second marker of the at least two movable markers is movable in a second direction, wherein the first direction is not parallel to the second direction;
assigning, based on a first location of a first movable marker, the weight for the similarity function corresponding to the first location;
selecting the one or more items from the collection of items based on the weight of the similarity function as determined from the first location of the first movable marker.

27. A program product for selecting one or more items from a collection of items, the program product comprising one or more programs which, when executed, perform the acts of:
providing an interface adapted to allow a user to assign one or more weights to one of a plurality of criteria associated with at least one of the items by moving at least two movable markers displayed on an interface, one or more of the weights defining a similarity function; and applying the similarity function to the plurality of criteria and to each of the items in order to select one or more items from the collection of items;

providing an interface region comprising the at least two movable markers movable by the user;

determining a location for each of the at least two movable markers on the interface region comprising two or more dimensions, each movable marker corresponding to one of the plurality of criteria, wherein a first movable marker corresponds to a first criterion for changing a weight of the similarity function based on a location of the first movable marker, wherein a first marker of the at least two movable markers is movable in a first direction and a second marker of the at least two movable markers is movable in a second direction, wherein the first direction is not parallel to the second direction;

assigning, based on a first location of a first movable marker, the weight for the similarity function corresponding to the first location;

selecting the one or more items from the collection of items based on the weight of the similarity function as determined from the first location of the first movable marker.

28. A system for selecting one or more items from a collection of items, the system comprising:

a memory for storing the collection of items and a plurality of criteria; and at least one processor, coupled to the memory, operative:

to display an interface region comprising two or more dimensions;

to associate a predetermined location on the interface region with a user selected item selected by a user from the one or more items from the collection of items;

to determine locations of a plurality of movable markers on the interface region, each of the plurality of movable markers corresponding to a criterion and being moveable by the user, wherein a first movable marker corresponds to a first criterion for changing a weight of a similarity function based on a location of the first movable marker, wherein a first marker of the at least two movable markers is movable in a first direction and a second marker of the at least two movable markers is movable in a second direction, wherein the first direction is not parallel to the second direction; and to determine weights for the criteria corresponding to the plurality of movable markers, the determination of the weights based on corresponding locations of markers on the interface region and based on distances from the corresponding locations to a predetermined location on the interface region;

wherein the weights are used to weight the plurality of criteria when selecting the one or more items from the collection of items, and wherein the one or more items is selected from the collection of items based on the weight of the similarity function as determined from the first location of the first movable marker.

* * * * *